United States Patent [19]
Venkateswar et al.

[11] Patent Number: 5,453,778
[45] Date of Patent: Sep. 26, 1995

[54] METHOD AND APPARATUS FOR SPATIAL MODULATION IN THE CROSS-PROCESS DIRECTION

[75] Inventors: Vadlamannati Venkateswar; William E. Nelson, both of Dallas, Tex.

[73] Assignee: Texas Instruments Incorporated, Dallas, Tex.

[21] Appl. No.: 100,892

[22] Filed: Jul. 30, 1993

[51] Int. Cl.$^6$ .......................... B41J 2/435; G03G 15/04
[52] U.S. Cl. .......................................... 347/239; 355/228
[58] Field of Search ..................... 355/228; 346/107, 346/160; 347/239, 240

[56] References Cited

U.S. PATENT DOCUMENTS

| | | | |
|---|---|---|---|
| 4,596,992 | 6/1986 | Hornbeck | 346/107 R X |
| 4,853,738 | 8/1989 | Rushing | 355/327 |
| 4,940,314 | 7/1990 | Hecht | 346/106 X |
| 4,949,135 | 8/1990 | Ng | 355/327 |
| 4,956,619 | 9/1990 | Hornbeck | 359/317 |
| 5,105,207 | 4/1992 | Nelson | 346/160 |
| 5,151,718 | 9/1992 | Nelson | 346/160 |
| 5,191,464 | 3/1993 | Hecht | 359/263 |
| 5,285,196 | 2/1994 | Gale | 345/108 |

*Primary Examiner*—Fred L. Braun
*Attorney, Agent, or Firm*—Julie L. Reed; Richard L. Donaldson; Rene E. Grossman

[57] ABSTRACT

A method and apparatus for spatial modulation in the cross-process direction. A spatial light modulator includes an array (12) of individual elements. Light from a light source (14) is reflected from these individual elements onto phases of pixels (20 and 54) of an organic photoconductive drum (16) thereby determining the gray shade of that pixel. The light from the individual elements may be focused through optics (18).

19 Claims, 3 Drawing Sheets

3 PHASES IN X DIRECTION

3 PHASES IN X DIRECTION

4 PHASES IN X DIRECTION

METHOD AND APPARATUS FOR SPATIAL MODULATION IN THE CROSS-PROCESS DIRECTION

RELATED APPLICATIONS

This application is related to the following copending U.S. patent applications assigned to Texas Instruments Incorporated: Ser. No. 08/038,398, filed Mar. 29, 1993, "Process and Architecture for Digital Micromirror Printer," TI-17632; Ser. No. 08/038,391, filed Mar. 29, 1993, "Gray Scale Printing Using Spatial Light Modulators," TI-17611.

TECHNICAL FIELD OF THE INVENTION

This invention relates generally to spatial modulation, and more particularly to a method and apparatus for spatial modulation in the cross-process direction.

BACKGROUND OF THE INVENTION

Spatial light modulator (SLM) technology has found applications in many fields, a significant one of which is that of printing. In particular, a sub-class of SLMs, known as deformable-mirror devices or digital micromirror devices (DMDs), provide significant advantages when used in printing systems.

In such systems, two types of data are typically presented. The first type of printing data is image data. Image data includes, for example, pictures of objects, such as those reproduced from photographs. With image data, the ability to print shades of gray (gray scale data) is imperative. Generally speaking, the ability to produce more shades of gray results in higher quality image printing. This ability, however, is often expensive and complicated to achieve. Thus, there is a significant need to reduce the complexity and cost of systems that can generate high quality images.

The second type of data is graphics data, such as data for text or charts. Graphics data is predominantly black and white, or other pure saturated colors. With graphics data, there is less need for gray shades. Thus, high quality graphics data can be printed so long as the resolution of the printer is high. Resolution is generally measured as the number of dots per inch that can be printed on a page. At lower resolutions, boundaries of graphics objects appear jagged. High resolution graphics require 600 dots per inch or higher. As such high resolution systems are often complex and expensive, there is an ever pressing need to reduce their cost and complexity.

Existing electro photo-graphic printer technologies make use of an organic photoconductive (OPC) drum. Depending on the type of photoconductor used, the drum is either charged or discharged to attract toner, with the charging or discharging accomplished by reflecting light onto the drum from a DMD array. Ideally, the amount of toner that clings to any point on the drum would be a function of the level of charge (or discharge) on that point. In this ideal case, gray scaling could be done simply by adjusting the charge or discharge of each point so as to control the amount of toner on any point, and thus the gray scale printed. However, with existing technologies, toner clings to the drum in such a manner that typically about four to thirty-two levels of gray can be achieved by controlling the charge on a particular point on the drum.

Therefore, gray scales of the kind required for high resolution imaging can be produced only by taking advantage of these relatively few levels of gray scale and the ability of the human eye to integrate over an area. For example, a mid-level gray dot will perceived if smaller dots of lighter and darker than mid-level gray are printed next to each other. For example, if two lighter gray dots of 1/600 of an inch square and two darker gray dots of 1/600 of an inch square are printed next to each other, the eye will integrate the four dots and perceive a mid-gray of the size of about 1/300 of an inch square. With DMD technology, this may be accomplished by using a high number of small mirrors, a technique that is expensive and complicated.

With OPC drum printing as described above, a page is printed by writing data to the drum array by array. The direction the drum turns is known as the process direction. As the drum rotates, overlapping arrays of data are superposed on the drum as light exposure is accumulated on the drum by integration of several DMD array exposures.

Two types of light modulation can be achieved by using DMD technology: intensity modulation and spatial/area modulation. Techniques have been presented for printing gray scales by the use of intensity modulation, and for also area modulation in the process direction. See for example, copending U.S. patent application Ser. No. 08/038,398, filed Mar. 29, 1993, entitled "Process and Architecture for Digital Micromirror Printer," TI-17632, assigned to Texas Instruments Incorporated. Area modulation was achieved by overlapping DMD exposures on the drum by non-integer displacements (an integer displacement by one pixel re-aligns the current exposure with the previous exposure). Such techniques, and systems do not allow, however, for the generation of gray scales by taking advantage of area modulation in the cross-process direction.

Therefore, a need has arisen for a method and apparatus that allows for the generation of gray scales by achieving spatial modulation in both the process and cross-process direction. Furthermore, a need has arisen for a method and apparatus for more accurate addressing of pixels to allow for high quality graphics printing without significant cost or complexity.

SUMMARY OF THE INVENTION

In accordance with the present invention, a method and apparatus for spatial modulation in the cross-process direction is provided which substantially eliminates or reduces disadvantages and problems associated with prior art systems.

In particular, a method is providing for generating a plurality of shades of gray, in which light is shone on a spatial light modulator, the spatial light modulator having a plurality of rows of individual elements, with predetermined ones of the rows being staggered with respect to other rows. Light is reflected such that light from predetermined individual elements of a plurality of the rows falls on predetermined phases of pixels of a photoconductive drum that rotates in a process direction. Toner is attracted to the phases, with the amount of toner attracted being based on the amount of light that has fallen on that phase. The toner is then transferred to a print medium, with the amount of toner transferred from all phases of a particular pixel determining the shade of gray transferred by that pixel.

Furthermore, a printer is disclosed that includes a light source that shines on a spatial light modulator. The spatial light modulator has a plurality of rows of individual elements, with predetermined ones of the rows being staggered with respect to other rows. A photoconductive drum is operable to rotate in a process direction and has predefined pixels with phases operable to receive light reflected from predetermined individual elements of a plurality of rows.

Also disclosed is a method of reducing jagged edges in printing of graphics data, wherein light is shone on a spatial light modulator, the spatial light modulator having a plurality of rows of individual elements, with predetermined ones of the rows being staggered with respect to other rows. The light is reflected from the individual elements such that light falls only on predetermined phases of pixels of a photoconductive drum, with the predetermined phases corresponding to the location of the graphics to be printed.

An important technical advantage of the present invention is the fact that the staggering of the rows allows for increased addressability in the cross-process direction. In particular, the staggering of rows allows for spatial modulation in the cross-process direction by overlapping of the phases. This advantage, combined with spatial modulation in the process direction, allows for generation of many gray scales for the printing of image data and allows for reduction of jagged edges in the printing of graphics data.

BRIEF DESCRIPTION OF THE DRAWINGS

For a more complete understanding of the present invention, and the advantages thereof, reference is now made to the following descriptions taken in conjunction with the accompanying drawings, in which like reference numbers indicate like features, and wherein.

Figure 8A:
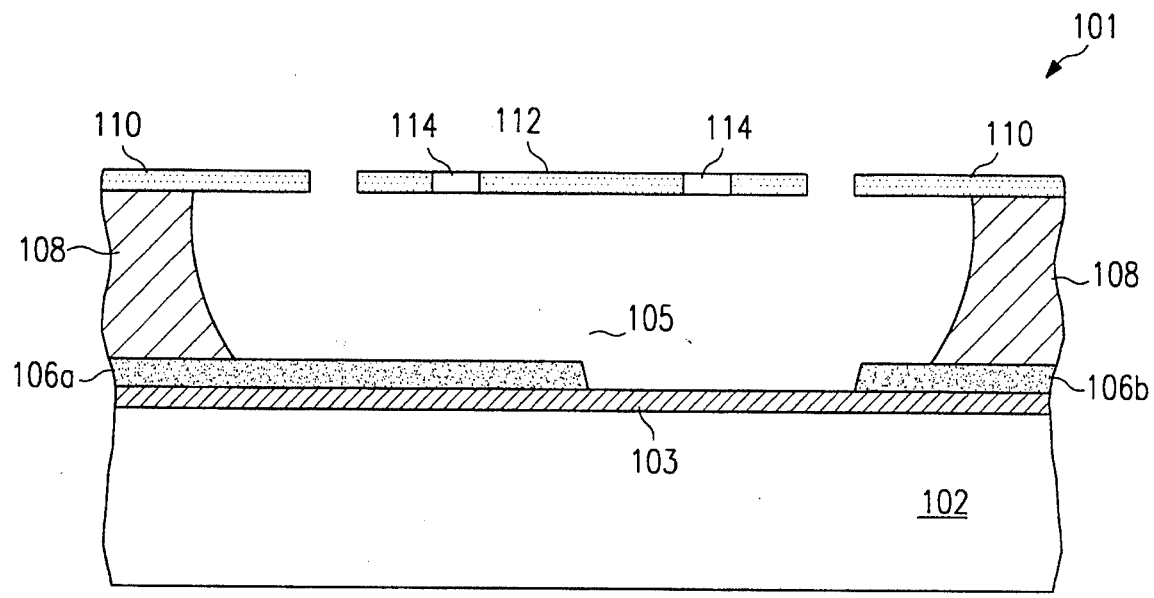
FIGS. 8a–8b show an example of a spatial light modulator and its operating circuitry. The modulator element 101 is suspended over an air gap 105 by a post 108. At the bottom of the air gap lies an electrode 107. When the electrode is activated, the element 101 deflects towards the electrode. Light impinging upon the surface of element 101 is then reflected off at an angle from the element, thereby allowing control of the light's reflection by the deflection of the element. The electrode 107 lies on an insulating layer 103, which in turn lies on a substrate 102. The element is shown in greater detail in FIG. 8b.

The element is supported on the pose 108 from FIG. 8a by hinges 116. The reflective surface 112 has holes 114 through which the underlying material is etched after the structure is completed, thereby allowing the formation of the air gap into which the element deflects. The triangular area 110 is that area upon which the electrode's activation has effect, causing the element to deflect.

DETAILED DESCRIPTION OF THE INVENTION

Figure 1:
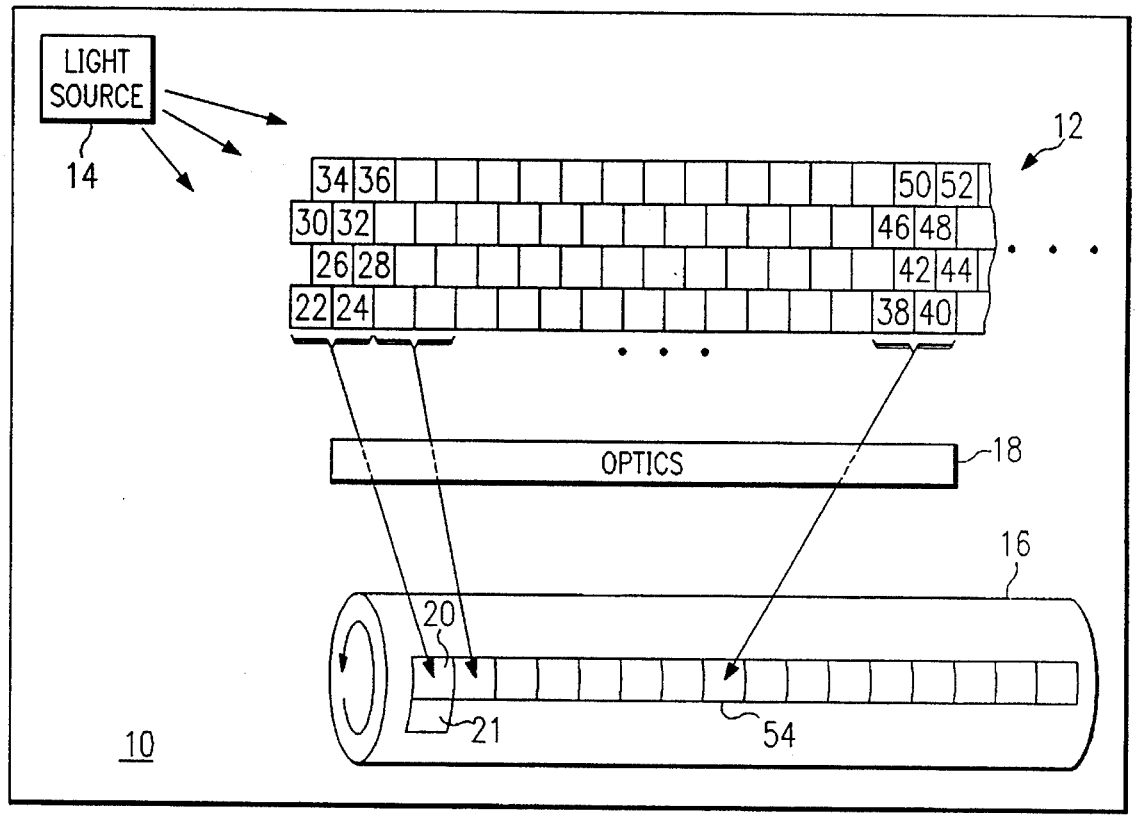
FIG. 1 illustrates a printer constructed according to the teachings of the present invention.
Figure 8B:
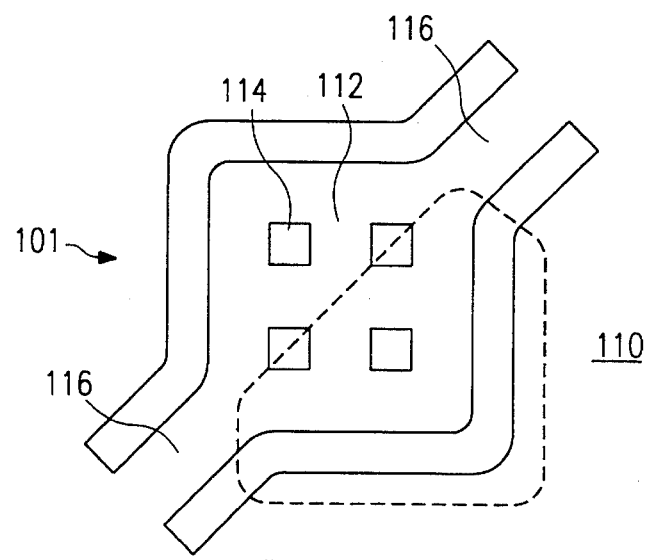

FIG. 1 illustrates a printer 10 constructed according to the teachings of the present invention. As shown in FIG. 1, a spatial light modulator (SLM) having individual elements making up an array 12 is provided. In a particular embodiment, array 12 comprises an array of DMDs. Throughout this description, individual elements of the array 12 will be referred to as mirrors. Array 12 may comprise an array of DMDs constructed as disclosed in U.S. Pat. No. 4,956,619, "Spatial Light Modulator," which is herein incorporated by reference. An example of such a modulator is shown in FIGS. 8a–8b.

As shown in FIG. 1, each row of array 12 is staggered, such that individual mirrors (elements) are offset from row to row. This offset will be exploited, as discussed below, to allow for generation of many gray scales for the printing of image data and for the printing of smooth edges for graphics data. Only a portion of array 12 is shown for clarity, it being understood that array 12 may include more rows or columns, as particular applications require.

Light from a light source 14 is reflected by array 12 either onto or off of OPC drum 16. Light source 14 may comprise a light-emitting diode. Light from array 12 may be reflected directly onto OPC drum 16 or focused through optics 18.

As shown in FIG. 1, light received from array 12 falls on OPC drum 16. Only a line of logical pixels is shown for clarity, it being understood that several lines of pixels can be simultaneously illuminated by the DMD array. Each of these pixels will be illuminated and thereby either charged or discharged for toner attraction. The drum 16 will then rotate over the page to be printed, and the toner will be transferred from the drum 16 to the page, the line of pixels printing a line on the page.

For the illustrated example, we will assume that the position (ON or OFF) of the mirrors in the array are updated for every one-quarter of a pixel drum movement. Other update speeds are possible, without departing from the scope of the invention. With this scheme, as shown in FIG. 1, an exemplary pixel 20 receives light from mirrors 22–36 of array 12. The light is received from each row of mirrors at different time instances as the drum rotates. Likewise, mirrors 38–52 reflect light onto pixel 54 of OPC drum 16. Pixel 21 is also shown, and will be discussed below. Pixel 21 will be exposed by mirrors 22–36 as OPC drum 16 rotates.

Figure 2A:
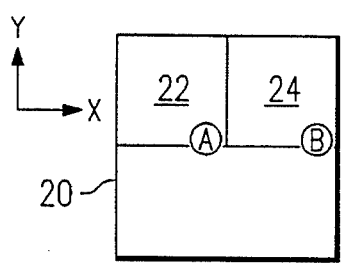
FIGS. 2a–2f illustrate various phases of a pixel to be printed according to the teachings of the present invention.

FIGS. 2a–2f illustrate light received at pixel 20 from each of the mirrors 22–36. As shown in FIG. 2a, light from mirrors 22 and 24 first impinges on the top of pixel 20. In a particular embodiment, the mirrors of array 12 shine light on an area approximately ¼ the area of pixel 20. For example, pixel 20 may be ⅓₀₀ of an inch by ⅓₀₀ of an inch, whereas the light from mirror 22 may be ⅙₀₀ of inch by ⅙₀₀ of an inch. It should be understood that other sized and shaped pixels and mirrors are possible, or the effective size of the mirrors may be altered through optics 18, without departing from the intended scope of the invention.

Figure 2B:
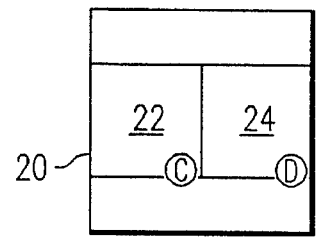

The particular area on pixel 20 on which light from any one mirror falls is referred to as a phase. Thus, as shown in FIG. 2a, light from mirrors 22 and 24 fall on phases A and B, shown by the circled A and B. The duration for which the light falls can be controlled by switching the mirrors OFF or alternatively switching the light source OFF. As shown in FIG. 2b, as time goes on and the OPC drum 16 rotates, in this example by a quarter of a pixel, light from mirrors 22 and 24 falls on phases C and D.

Figure 2C:
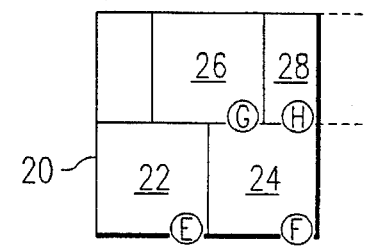

As shown in FIG. 2c, as OPC drum 16 continues to rotate, light from mirrors 22 and 24 falls on phases E and F, and light from mirrors 26 and 28 falls on phases G and H. As can be seen in FIG. 2c, phase H falls half on pixel 20 and half on the adjacent pixel of OPC drum 16. This light falling on the adjacent pixel can be handled in one of two ways. First, it can be taken into account in determining the gray scale to be generated in the adjacent pixel. Thus, if the gray scale of the adjacent pixel is to be, for example, level 200 of 256 gray levels, the amount of light received on that pixel from phase H can be taken into account. Alternatively, the light received from phase H on the adjacent pixel can be disregarded. Indeed, if the adjacent pixel is to be completely white, then this is the only alternative, and there will be some blur between pixels.

Figure 2D:
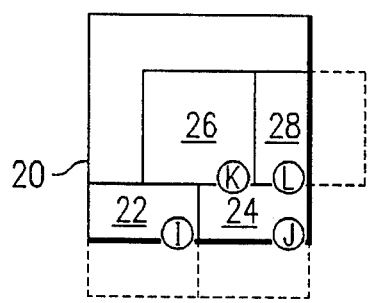

As shown in FIG. 2d, as OPC drum 16 continues to rotate, the light from mirrors 22 and 24 falls on phases I and J. As discussed above in connection with FIG. 2c, phases I and J overlap on to the pixel of the next line of OPC drum 16. This overlap can either be taken into account in determining the gray scale to be generated on that pixel, or disregarded. The light from mirrors 26 and 28 falls on phases K and L.

Figure 2E:
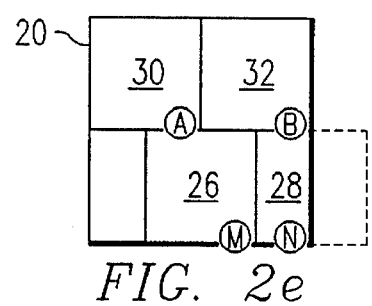
Figure 2F:
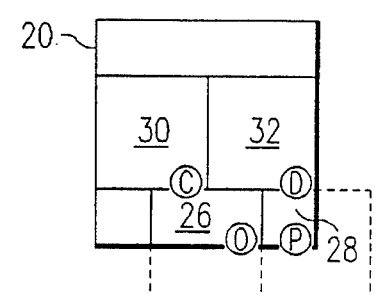

As shown in FIG. 2e, as OPC drum 16 continues to rotate, the light from mirrors 26 and 28 falls on phases M and N, with the overlap being handled as discussed above. Furthermore, light from mirrors 30 and 32 falls on phases A and B, as shown in FIG. 2e. Furthermore, at this time light from mirrors 22 and 24 fall on phases A and B of pixel 21. As shown in FIG. 2f, light from mirrors 26 and 28 next falls on overlap phases O and P, and the light from mirrors 30 and 32 next falls on phases C and D.

FIGS. 2a–2f illustrate sixteen distinct phases of a particular pixel 20. This corresponds to four phases in the process direction and four phases in the cross-process direction. Because OPC drum 16 is continually rotating, it should be understood that the phase locations in the Y (process) direction are chosen as needed by the particular application. Light is distinctly located on these chosen phase locations in one of two ways. First, the light source 14 can be pulsed on and off, (typically by a processor, such as processor 100 in FIG. 7) such that it is on only when the light from particular mirrors would fall on the predefined phase locations. This technique is known as pulse-positioning and is described in copending U.S. patent application Ser. No. 08/038,398, filed Mar. 29, 1993, entitled "Process and Architecture for Digital Micromirror Printer," assigned to Texas Instruments Incorporated, and which is herein incorporated by reference. That patent application also describes a second technique, in which the light from light source 14 is kept on, while the mirrors 22–36 are switched to reflect light to OPC drum 16 only when the light will fall on the predefined phase locations.

The phase location in the X (cross-process) direction are determined solely by the horizontal positioning of the mirrors. Thus, four cross-process direction phase locations are presented in FIGS. 2a–2f, corresponding to light from mirrors 22, 24, 26 and 28. By increasing the staggering, more X-direction phase locations can be realized. With mirrors producing phases with side dimensions of approximately 1/600 of an inch and pixel sizes of approximately 1/300 of an inch on a side, four phase locations in the Y-direction provide for excellent results. Increasing the number of phase locations in the Y-direction to too great of a number leads to diminishing returns, as the limitations of the toner come into play. Given the finite size of the toner particles, no spatial (area) modulation is achieved if two phases are not separated by a distance of approximately the diameter of a toner particle. The same is true for phase locations in the X-direction.

As described in copending U.S. patent application Ser. No. 08/038,398, filed Mar. 29, 1993, "Process and Architecture for Digital Micromirror Printer," TI-17632, herein incorporated by reference, generating a gray scale at a particular pixel involves the following steps. First, light is reflected onto all phases of the pixel and accumulated through time integration. This light discharges (or charges) the OPC at the pixel and creates a three-dimensional voltage profile. The relationship between the light exposure and this voltage is non-linear and the non-linear curve is called the Photo-Induced Discharge Curve (PIDC). A development potential is applied to the OPC and the toner particles are brought into contact. The mass of toner attracted to the pixel has a non-linear relationship to the voltage. The toner is then fused to the paper by applying heat. The mass of toner fused determines the gray scale.

It should be understood from the above description that there is no simple relationship between the light exposure on the OPC and the final gray scale. This relationship can be determined experimentally or through modeling and expressed as a lookup table that relates gray scale to the light exposure needed on each phase. Through the following description, use of the term gray scales will refer to the cumulative light exposure at a pixel, rather than the actual perceived gray scale. Due to the non-linear relationship described above, it is possible that two different exposure profiles may result in the same perceived gray scale, and alternatively that two different profiles with the same cumulative exposure may result in different perceived gray scales.

To provide for high levels of gray scale resolution, the intensity of light source 14 can be changed as the mirrors 22–36 reflect light onto pixel 20. Thus, for example, the light intensity of light source 14 can be set at a particular level for light reflected onto pixel 20 from mirrors 22–28. The control of the light intensity can be accomplished by the processor 100 in FIG. 7, just as the light's on and off cycles can be controlled. Light source 14 can then be intensified, for example, to twice the original intensity level, for the light impinging on pixel 20 from mirrors 30–36. (Note that at the same time mirrors 22–28 expose pixel 21 just below pixel 20.) In this way, the intensity at any one phase can be either zero, the first intensity level, the second intensity level, or the sum of the first and second intensity levels.

For example, the light intensity at phase A is determined by mirror 22 and mirror 30, as shown in FIGS. 2a and 2e. Thus, the intensity at phase A will be the sum of the light intensity received at that phase at FIGS. 2a and 2e.

As discussed above, mirrors 22–36 are all used to determine the intensity of light received by, and therefore the gray scale, of pixel 20. It should be understood, however, that more or less mirrors may be used without departing from the intended scope of the present invention. For example, only mirrors 22, 24, 26 and 28 could be used to generate the sixteen phases of pixel 20. However, with such an arrangement fewer intensity levels can be imparted to each phase, and therefore to pixel 20, thereby limiting the number of gray scales that can be generated at pixel 20. Similarly, increasing the number of mirrors that reflect light onto pixel 20 would increase the number of intensity levels that could be received by each of the phases, and therefore by pixel 20, thereby increasing the number of gray scales.

With the example shown in FIGS. 2a–2f, and with two intensity levels for light source 14, the second intensity level being twice that of the first intensity level, any one phase may have an intensity of either zero, one, two, or three times the first intensity level written to it over time. (A zero intensity level is achieved by switching a mirror to prevent reflection onto a phase.) Thus, with sixteen phases, the maximum cumulative exposure of pixel 20 is sixteen times three, or forty-eight. The minimum exposure is sixteen times zero, or zero. Therefore, there are forty-nine distinct gray scales that could be written to pixel 20.

For clarity, mirrors 22–28 are considered a single group of mirrors. Likewise, mirrors 30–36 are considered a single group of mirrors. With three such groups, by alternating the intensity of light source 14 in a binary sequence, such that the light intensity is either one times, two times, or four times a base intensity, then the intensity at any one phase would be between zero and seven. Therefore, the maximum cumulative exposure at pixel 20 would be sixteen phases times seven, or one hundred twelve. The minimum exposure would be zero, and therefore there would be one hundred thirteen possible gray scales that could be written to pixel 20.

With four groups of mirrors, and the light intensity of light source 14 increased in a binary sequence of one times, two times, four times, and eight times a particular base intensity level, then any one phase could have an intensity level between zero and fifteen. Thus, the maximum cumulative exposure of pixel 20 will be two hundred forty, representing all sixteen phases at the maximum intensity level of fifteen. With the minimum exposure of zero, there would be two hundred forty one gray scales available at pixel 20.

As can be seen from these examples, increasing the number of groups of pixels will allow for an increase in the number of gray scales that can be generated at a particular pixel.

Figure 3:
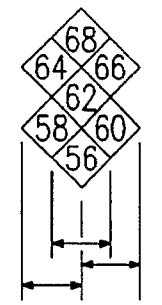
FIG. 3 illustrates an alternative mirror arrangement for printing according to the teachings of the present invention.
Figure 4:
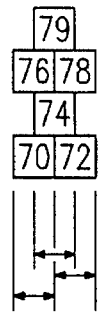
FIG. 4 illustrates an alternative mirror arrangement for printing according to the teachings of the present invention.
Figure 5:
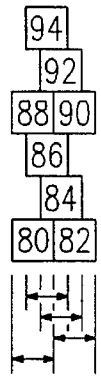
FIG. 5 illustrates an alternative mirror arrangement for printing according to the teachings of the present invention.

Other mirror arrangements than that discussed above can be used to generate phases at different locations and of different dimensions. FIGS. 3, 4, and 5 illustrate examples of such mirror arrangements. FIG. 3 illustrates an arrangement of mirrors 56–68. Such an arrangement provides for three phase locations in the cross-process direction. As discussed above, the phase locations in the Y (process) direction are pre-determined and controlled by either pulsing the light source 14 or controlling the mirrors to turn on, if at all, only at pre-determined times corresponding to the pre-determined phases. Thus, the number of phase locations in the Y direction is determined by the needs of the particular application.

FIG. 4 illustrates another mirror arrangement in which mirrors 70–79 are used to illuminate a particular pixel 20. FIG. 4 allows for three phase locations in the cross-process direction. These phase locations are dictated by the positions of mirrors 70 and 76, 74 and 79, and 72 and 78. The mirrors 70, 72, and 74 may be used to generate three phase locations in the cross-process direction without mirrors 76, 78, and 79. The inclusion of mirrors 76, 78, and 79 is for the purpose of allowing the writing of more intensity levels to pixel 20, thereby allowing for a greater number of gray scales.

FIG. 5 illustrates a mirror arrangement of mirrors 80–94. This arrangement allows for four phase locations in the X direction. Mirrors 80, 82, 84, and 86 may be used, without mirrors 88, 90, 92 and 94, to provide these four phase locations in the X direction. The inclusion of mirrors 88–94 allows for the writing of additional intensities, thereby allowing for more gray scales.

In each of the above-described examples, the number of mirror groups may be increased to allow for modulation of the light intensity to allow for more intensity levels to be written to each phase, and therefore each pixel. Furthermore, more staggering can be used to increase the number of cross-process phase locations.

Figure 6:
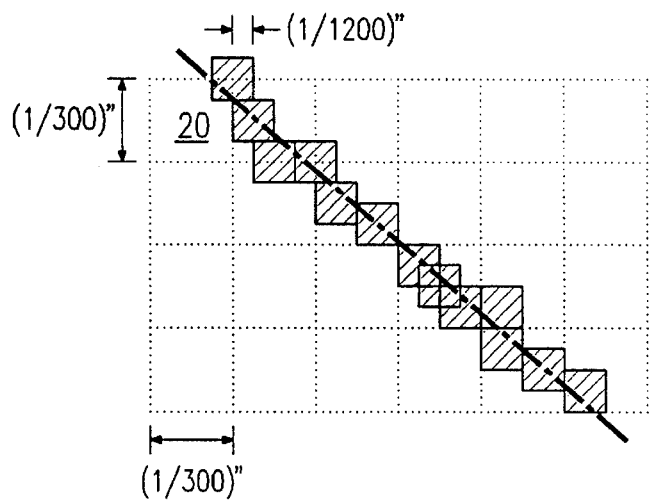
FIG. 6 illustrates a diagonal line printed in high resolution graphics according to the teachings of the present invention.

Another important application for the present invention is that of increased resolution for printing of graphics data. FIG. 6 illustrates an array of printed pixels on a page. The top left pixel is pixel 20. As shown in FIG. 6, the size of each pixel in this example is approximately 1/300 of an inch by 1/300 of an inch. This size is generally not sufficient for high resolution graphics. However, with the present invention, high resolution graphics is available with this pixel size. The staggered rows of the present invention allow for phases in the cross-process direction, thus allowing for greater flexibility in the positioning of data.

As shown in FIG. 6, these phases are in effect sub-pixels, and allows for increased addressability on a printed page. By staggering the rows, as shown in the example of FIG. 2a–2f, sub-pixels of a size of 1/600 of an inch on a side may be addressed to the accuracy of 1/1200 of an inch. This increased addressability allows for more precise location of dots on a page, therefore allowing for increased resolution in graphics. A classic example is shown in FIG. 6, in which a diagonal line is illustrated. The increased addressability provided by the present invention allows for the printing of sub-pixels very close to the ideal diagonal line, thereby eliminating the jagged edges so apparent in lower resolution systems.

Figure 7:
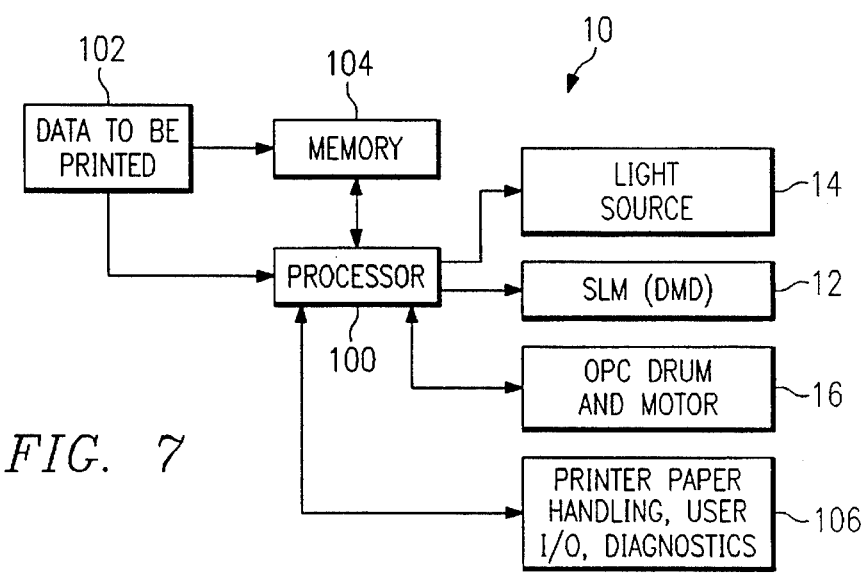
FIG. 7 illustrates a block diagram of processor control of a printer constructed according to the teachings of the present invention.

FIG. 7 illustrates a block diagram of the circuitry that controls printer 10. As shown in FIG. 7, a processor 100 receives data to be printed from block 102 either directly or through memory 104. Block 102 may represent any device that can output data to be printed, such as a personal computer. The memory 104 may be used to buffer data to be printed from block 102 or may store other data, such as pre-programmed data, for later printing. Memory 104 also includes instructions for controlling processor 100. Processor 100 is coupled to light source 14, array 12, and OPC drum and motor 16. Processor 100 is also coupled to printer paper handling, user I/O, and diagnostics block 106.

In operation, processor 100 processes the data to be printed by controlling light source 14 and array 12. For example, for image data, processor 100 will determine the gray scale that must be written to a particular pixel, and controls the particular mirrors of array 12 and light source 14 to accomplish that intensity at the pixel. As an example, the intensity of light source 14 may be progressed in a binary sequence from one times to two times to four times and back again for an array 12 having three groups of mirrors for each pixel. Processor 100 will control the particular mirrors of array 12 to ensure the proper intensity is directed to a particular pixel. Processor 100 also controls the rotation of the OPC drum and the paper handling, user I/O and diagnostics as required by the printer system.

Although the present invention and its advantages have been described in detail, it should be understood that various changes, substitutions and alterations can be made herein without departing from the spirit and scope of the invention as defined by the appended claims.

What is claimed is:

1. A method of generating a plurality of shades of gray, comprising the steps of:

shining light on a spatial light modulator, the spatial light modulator having a plurality of rows of individual elements, predetermined ones of the rows being staggered with respect to other rows;

reflecting the light such that light from predetermined individual elements of a plurality of rows falls on predetermined phases of pixels of a photoconductive drum operable to rotate in a process direction, such that at least one of said predetermined phases is in the cross-process direction;

attracting toner to the phases, the amount of toner attracted to a particular phase being based on the amount of light that has fallen on that phase; and transferring the toner to a print medium, the amount of toner transferred from all phases of a particular pixel determining the shade of gray transferred by that pixel.

2. The method of claim 1, wherein the rows are staggered such that there are at least two cross-process phase locations for each pixel.

3. The method of claim 1, wherein said step of shining comprises pulsing the light such that each individual element is operable to reflect light on at least two phase locations in the process direction of a respective pixel.

4. The method of claim 1, and further comprising the step of periodically changing the intensity of the light.

5. The method of claim 1, wherein said step of shining comprises pulsing the light such that each individual element is operable to reflect light on at least two phase locations in the process direction of a respective pixel, and further comprising the step of periodically changing the intensity of the light.

6. The method of claim 1, wherein said step of reflecting comprises switching the individual elements such that each individual element is operable to reflect light on at least two phase locations in the process direction of a respective pixel.

7. A printer, comprising:

a light source;

a spatial light modulator operable to receive light from said light source, said spatial light modulator having a plurality of rows of individual elements, predetermined ones of said rows being staggered with respect to other rows; and a photoconductive drum operable to rotate in a process direction and having predefined pixels with phases operable to receive light reflected from predetermined individual elements of a plurality of rows, wherein said phases operable to receive light include phases in the cross-process direction.

8. The printer of claim 7, wherein said rows are staggered such that there are at least two cross-process phase locations for each pixel.

9. The printer of claim 7, and further comprising pulsing circuitry operable to periodically pulse said light source such that light is reflected onto at least two phase locations in the process direction of a respective pixel.

10. The printer of claim 7, and further comprising circuitry operable to switch said individual elements such that light is reflected onto at least two phase locations in the process direction of a respective pixel.

11. The printer of claim 7, and further comprising circuitry operable to periodically change the intensity of said light source.

12. The printer of claim 7, wherein the staggering of the rows repeats periodically, and further comprising circuitry operable to change the intensity of said light source each time the staggering repeats.

13. The printer of claim 12, wherein each pixel receives light from individual elements of at least two groups of staggered rows.

14. The printer of claim 7, wherein said individual elements comprise deformable-mirror devices.

15. The printer of claim 7, wherein each pixel receives light from at least two respective individual elements.

16. A method of reducing jagged edges in printing of graphics data, comprising the steps of:

shining light on a spatial light modulator, the spatial light modulator having a plurality of rows of individual elements, predetermined ones of the rows being staggered with respect to other rows; and reflecting the light from the individual elements such that light falls only on predetermined phases of pixels of a photoconductive drum operable to rotate in a process direction, the predetermined phases corresponding to the location of the graphics to be printed, wherein said predetermined phases of pixels include at least one phase in the cross-process direction.

17. The method of claim 16, wherein the rows are staggered such that there are at least two cross-process phase locations for each pixel.

18. The method of claim 16, wherein said step of shining comprises pulsing the light such that each individual element is operable to reflect light on at least two phase locations in the process direction of a respective pixel.

19. The method of claim 16, wherein said step of reflecting comprises switching the individual elements such that each individual element is operable to reflect light on at least two phase locations in the process direction of a respective pixel.

* * * * *